United States Patent
Lohtia

(10) Patent No.: US 9,532,195 B2
(45) Date of Patent: *Dec. 27, 2016

(54) LOCATION BASED MESSAGING

(71) Applicant: TeleCommunication Systems, Inc., Annapolis, MD (US)

(72) Inventor: Sunit Lohtia, Cherry Hill, NJ (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,438

(22) Filed: Jan. 14, 2015

(65) Prior Publication Data

US 2015/0126230 A1    May 7, 2015

Related U.S. Application Data

(63) Continuation of application No. 12/140,577, filed on Jun. 17, 2008, now Pat. No. 8,965,417, which is a continuation of application No. 10/785,735, filed on Feb. 23, 2004, now Pat. No. 7,458,184.

(51) Int. Cl.
| | |
|---|---|
| H04W 4/12 | (2009.01) |
| H04W 4/14 | (2009.01) |
| H04W 8/14 | (2009.01) |
| H04M 1/725 | (2006.01) |
| H04W 8/18 | (2009.01) |
| H04W 4/02 | (2009.01) |
| H04W 88/18 | (2009.01) |

(52) U.S. Cl.
CPC .......... *H04W 4/12* (2013.01); *H04M 1/72552* (2013.01); *H04M 1/72572* (2013.01); *H04W 4/025* (2013.01); *H04W 4/14* (2013.01); *H04W 8/14* (2013.01); *H04W 8/18* (2013.01); *H04W 4/02* (2013.01); *H04W 88/184* (2013.01)

(58) Field of Classification Search
CPC ...................................................... H04W 4/02
USPC .......................................... 455/456.1–456.6
See application file for complete search history.

(56) References Cited

U.S. PATENT DOCUMENTS

| | | | |
|---|---|---|---|
| 5,937,053 A | 8/1999 | Lee | |
| 6,049,718 A | 4/2000 | Stewart | |
| 7,099,921 B1 * | 8/2006 | Engstrom et al. | ...... H04L 12/58 709/206 |
| 7,113,795 B2 | 9/2006 | Somani | |
| 2002/0007421 A1 | 1/2002 | Dixon | |
| 2002/0107003 A1 | 8/2002 | Martin | |
| 2002/0178165 A1 * | 11/2002 | Ohashi | ................... G06Q 30/02 |
| 2003/0105826 A1 | 6/2003 | Mayraz | |
| 2003/0125042 A1 | 7/2003 | Olrik | |

(Continued)

OTHER PUBLICATIONS

International Search Report and Written Opinion of the International Searching Authority, PCT Application Serial No. PCT/US2005/005661, Jul. 26, 2005.

(Continued)

*Primary Examiner* — Michael T Vu
(74) *Attorney, Agent, or Firm* — Tarolli, Sundheim, Covell & Tummino LLP

(57) ABSTRACT

Systems and methods are provided for messages, such as short messages and multi-media messages. In one implementation a message is received from a sender, a location of the sender is determined, the message is modified to include the location of the sender, and the modified message is transmitted to a recipient.

5 Claims, 13 Drawing Sheets

(56) References Cited

U.S. PATENT DOCUMENTS

| | | |
|---|---|---|
| 2003/0139193 A1 | 7/2003 | Buckley |
| 2003/0157942 A1* | 8/2003 | Osmo .................. H04W 4/02 |
| | | 455/456.1 |
| 2003/0235278 A1* | 12/2003 | Paila .................. H04L 12/587 |
| | | 379/88.13 |
| 2004/0103157 A1 | 5/2004 | Requena |
| 2004/0137921 A1 | 7/2004 | Valloppillil |
| 2004/0203903 A1 | 10/2004 | Wilson |
| 2004/0235505 A1 | 11/2004 | Lee |
| 2005/0075093 A1 | 4/2005 | Lei |
| 2005/0085239 A1 | 4/2005 | Cedervall |
| 2005/0089006 A1 | 4/2005 | Wang |
| 2005/0119015 A1 | 6/2005 | Linkola |

OTHER PUBLICATIONS

Non-Final Office Action, Nov. 7, 2005, U.S. Appl. No. 10/785,735.
Final Office Action, Apr. 7, 2006, U.S. Appl. No. 10/785,735.
Non-Final Office Action, Nov. 13, 2006, U.S. Appl. No. 10/785,735.
Non-Final Office Action, Sep. 21, 2007, U.S. Appl. No. 10/785,735.
Examination Report dated Jan. 27, 2009 from European Application No. 05 713 957.8.

* cited by examiner

LOCATION BASED MESSAGING

CROSS-REFERENCE TO RELATED APPLICATIONS

This application is a continuation of and claims priority to U.S. patent application Ser. No. 12/140,577, entitled "LOCATION BASED MESSAGING", filed on Jun. 7, 2008; which is a continuation of U.S. application Ser. No. 10/785,735, entitled "LOCATION BASED MESSAGING," filed Feb. 23, 2004, now U.S. Pat. No. 7,458,184, the entire contents of both of which are incorporated herein by reference.

BACKGROUND

The following disclosure relates to processing a message, such as a short message or a multi-media message.

Short messaging service (SMS) is a globally accepted service for transmitting short messages between wireless devices. Typically a "short message" is 160 alpha-numeric characters or less, and can be transmitted between mobile subscribers, e.g., using mobile telephones, over a wireless network or between a mobile device and a system external to the wireless network, such as application server for handling electronic mail or paging.

SMS uses the mobile application protocol (MAP) which, in the mobile network context, is an application layer protocol designed to support database interrogation and mobility management, and uses the services of the SS7 (Signalling System No. 7) transaction capabilities application part (TCAP). The American and the international standards bodies have defined a MAP layer using the services of the SS7 TCAP: the American standard is published by the Telecommunication Industry Association and is referred to as IS-41, and the international standard is defined by the European Telecommunication Standards Institute and is referred to as GSM (global standard for mobiles) MAP. Some additional protocols used in short messaging include the Short Message Peer to Peer (SMPP) protocol, an open industry standard messaging protocol designed to simplify integration of data applications with wireless mobile networks, and the Universal Computer Protocol (UCP).

A short messaging entity (SME) is an entity which may receive or send short messages, and may be located in a fixed network or a wireless network. For example, a SME can be a mobile station (MS), such as a mobile telephone, that sends and receives messages over a wireless network. A different example of an SME is a personal computer used to receive short messages into an e-mail account via an e-mail server that communicates with a wireless network.

Referring to FIG. 1, a base station system (BSS) 110 receives a short message transmitted from a mobile station (MS) 105. For example, the mobile station 105 can be a mobile telephone, and a user can input the short message using a user interface on the mobile telephone, and include a destination number that is associated with a recipient mobile station 145, i.e., a telephone number. A base-station system 110 typically consists of base-station controllers and base-transceiver stations and is responsible for transmitting voice and data traffic between mobile stations. The base-station system 110 transmits the short message to a mobile switching center (MSC) 115. The mobile switching center 115 performs switching functions for a mobile system and controls calls to and from other telephone and data systems; typically a MSC 115 services multiple base-station systems.

The short message is routed from the mobile switching center 115 to a short messaging service center (SMSC) 120. The SMSC 120 is responsible for the relaying and store-and-forwarding of a short message between short message entities, including mobile stations. The SMSC 120 makes a determination based on the destination number, for example, using a look-up table, whether the short message should be rerouted to a different SMSC or whether routing information for the short message can be obtained by the SMSC 120 from a home location register (HLR) 125. For the sake of simplicity, in this example, the SMSC 120 determines that routing information can be obtained from the HLR 125, and proceeds to interrogate the HLR 125 for the routing information. An HLR 125 is a database used for permanent storage and management of subscriptions and service profiles of network users. The routing information provided by an HLR 125 is at the "MSC level", meaning an HLR 125 can provide information as to which MSC in a wireless network to which to route the short message so that it can be routed to a recipient mobile station 145 associated with the destination number.

Based on the routing information, the SMSC 120 transmits the short message to a MSC 130 that is presently servicing the recipient mobile station 145 (i.e., as the recipient Mobile station 145 moves through the network, the MSC that is presently servicing the mobile station 145 can change). The MSC 130 interrogates a visitor location register (VLR) 135, which is a database that contains temporary location information about network users that are currently in the area of a base station serviced by the MSC 130. That is, the location information in the VLR 135 is at the base station transceiver (i.e., cell tower) level, as compared to the routing information provided by the HLR 125, which is at the MSC level. Based on information received from the VLR 135, the MSC 130 routes the short message to a base-station system 140 and from there the short message is delivered to the recipient mobile station 145.

Delivery of the short message to the recipient mobile station 145 is based on the destination number input by the user of the sender mobile station 105. In addition to the destination number, the short message typically includes a sender number, that is, a number that is associated with the sender mobile station 105, such as the sender's mobile telephone number. The recipient mobile station 105 can reply to the short message, which reply is automatically routed to the sender mobile station 105 based on the sender number included in the original short message, similar to an e-mail user clicking on the "reply" button when replying to an e-mail message. The reply short message is routed to the sender mobile station 105 using the same steps described above to route the original message to the recipient mobile station 145.

Multi-media messaging service (MMS) is similar to SMS, except that in addition to text, multi-media messages can include graphics, audio, images and video. A multi-media message can be transmitted from a sender mobile station 105 to a recipient mobile station 145 in a similar manner as an SMS, except that the SMSC 120 is replaced by a multi-media messaging center (MMSC), which provides corresponding functions for multi-media messages. In some instances, for example, if the recipient mobile station 145 is not MMS-enabled, the MMSC stores the content of the multi-media message and sends a short message, referred to as a "notification message", to the recipient mobile station 145 advising the recipient mobile station 145 that there is a multi-media message available for the recipient to retrieve from a location provided in the notification message as a link, for example, to a URL. A user of the recipient mobile station 145 can click on the link and retrieve the content of the multi-media message from the location, which may be a server included in the MMSC. A recipient of a multi-media message can be an e-mail address, in which case the MMSC routes the multi-media message to an application server, i.e., an e-mail server. MMS is a global service and also uses various well known protocols and standards.

SUMMARY

The following describes apparatus and techniques relating to messages, such as short messages and multi-media messages. In general, in one aspect, the invention features a method of processing a message, including the steps of receiving a message from a sender, determining a location of the sender, modifying the message to include the location of the sender, and transmitting the modified message to a recipient.

Implementations may feature one or more of the following. The message can be, for example, a short message or a multi-media message. The message can include a request to include the location of the sender in the message. The request can be a location-request code added to a destination number included in the message. Transmitting the modified message to a recipient can include transmitting the modified message to a recipient associated with the destination number. The message can be transmitted to a location server, based on the location-request code, and the location server can perform the steps of determining a location of the sender and modifying the message to include the location of the sender. The location server can further modify the message to remove the location-request code from the destination number.

Determining a location of the sender can include sending a request (e.g., from the location server) to a location-enabled server and receiving a location of the sender from the location-enabled server. Alternatively, a location of the sender can be retrieved from a cache of location information. Retrieving a location for the sender from a cache of location information can include: receiving location information from multiple network probes about locations of multiple network users including the sender; periodically caching the location information for the network users; and retrieving a location for the sender from the cache of location information.

The message can be further modified to add a location-request code to a sender number included in the message, where the location-request code is a request to include the recipient's location in a reply message to the message. Modifying the message to add a location-request code to a sender number can include determining if a location of the recipient can be included in a message originating from the recipient, and if a location of the recipient can be included, then modifying the message.

In general, in another aspect, the invention features a method of processing a message, including the steps of receiving a message from a first messaging service center, determining a location of a sender of the message, modifying the message to include the location of the sender, and transmitting the modified message to a second messaging service center.

Implementations can include one or more of the following. The message can be a short message, and the first messaging service center and the second messaging service centers can be short messaging service centers. Alternatively, the message can be a multi-media message, and the first messaging service center and the second messaging service centers can be multi-media messaging service centers. The first messaging service center and the second messaging service center can be the same messaging service centers. The first messaging service center can service a mobile network used by a sender of the message, and the second messaging service center can service a mobile network used by a recipient of the message.

The message can include a location-request code added to a destination number, and before transmitting the modified message to the second messaging service center, the message can be further modified to remove the location-request code from the destination number. Determining a location of the sender can include sending a request to a location-enabled server and receiving a location of the sender from the location-enabled server. Alternatively, determining a location of the sender can include retrieving a location for the sender from a cache of location information. Retrieving a location from a cache of location information can include receiving location information from multiple network probes about locations for multiple network users including the sender, periodically caching the location information for the network users, and retrieving a location for the sender from the cache of location information.

In general, in another aspect, the invention features, a method of processing a message including the steps of inputting a message into a mobile station, inputting into the mobile station a location-request code and a destination number, where the location-request code specifies a request to modify the message to include a location of the mobile station in the message and where the destination number specifies a destination for delivery of the message, and transmitting the message from the mobile station to a messaging service center. In one implementation the message can be a short message, and in another implementation the message can be a multi-media message.

In general, in another aspect, a system for processing a message features a sender mobile station, a messaging service center, a location server and a recipient messaging entity. The sender mobile station is configured to receive a user input and based on the user input transmit a message over a mobile network for delivery to a recipient messaging entity associated with a destination number, where the message includes a request to include a location of the sender mobile station in the message. The messaging service center is configured to receive from a sender mobile station a message including a request to include a location of the sender mobile station in the message, transmit the message to a location server, receive a modified message from a location server, transmit the modified message to a recipient messaging entity. The location server is configured to receive a message from a messaging center, the message including a request to include a location of a sender mobile station in the message; determine a location of the sender mobile station; modify the message to include the location; and transmit the modified message to a messaging center. The recipient messaging entity is configured to receive a message including a location of a sender mobile station from which the message originated.

Implementations can include one or more of the following. The message can be a short message, and the messaging service center can be a short messaging service center. Alternatively, the message can be a multi-media message, and the messaging service center can be a multi-media messaging service center.

In general, in another aspect, a method of processing a multi-media message includes the steps of receiving a multi-media message originating from a sender mobile station, the multi-media message including destination information; determining a location of the sender mobile station; modifying the multi-media message to include the location of the sender mobile station; and transmitting the modified multi-media message to a recipient based on the destination information.

Implementations can include one or more of the following. The transmitting step can further include accessing a user profile associated with the sender mobile station; based on the user profile and the destination information, determining an e-mail address associated with the recipient; and transmitting the modified multi-media message to the recipient e-mail address. Determining a location of the sender mobile station can include querying a location enabled server for a location of the sender mobile station, and receiving a location of the sender mobile station from the location enabled server.

Alternatively, determining a location of the sender mobile station can include retrieving a location for the sender mobile station from a cache of location information. Retrieving a location for the sender mobile station from a cache of location information can include receiving location information from multiple network probes about locations for a multiple network users including the sender mobile station, periodically caching the location information for the network users including the sender mobile station, and retrieving a location for the sender mobile station from the cache of location information.

Implementations of the invention can realize one or more of the following advantages. A current location of a sender mobile station can automatically be included in a message, such as a short message or multi-media message, originating from the sender mobile station. A location server can be used to determine a location of a sender mobile station and modify a message to include the location without requiring a software or hardware upgrade of mobile network elements, such as a short messaging service center or a multi-media messaging center. The short messaging service center or multi-media messaging center can process a short message or multi-media message that includes a location request without awareness of the location request, and the message can be seamlessly diverted to and received back from a location server with the location of the sender mobile station added thereto. Mobile users can use the location request service with a mobile station, e.g., a mobile telephone or other such handset, that is two-way SMS or MMS capable without requiring any upgrades to the mobile station. A user of a sending device can decide on a message-by-message basis whether to include a request to add the location of the sending device to a message originating from the sending device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
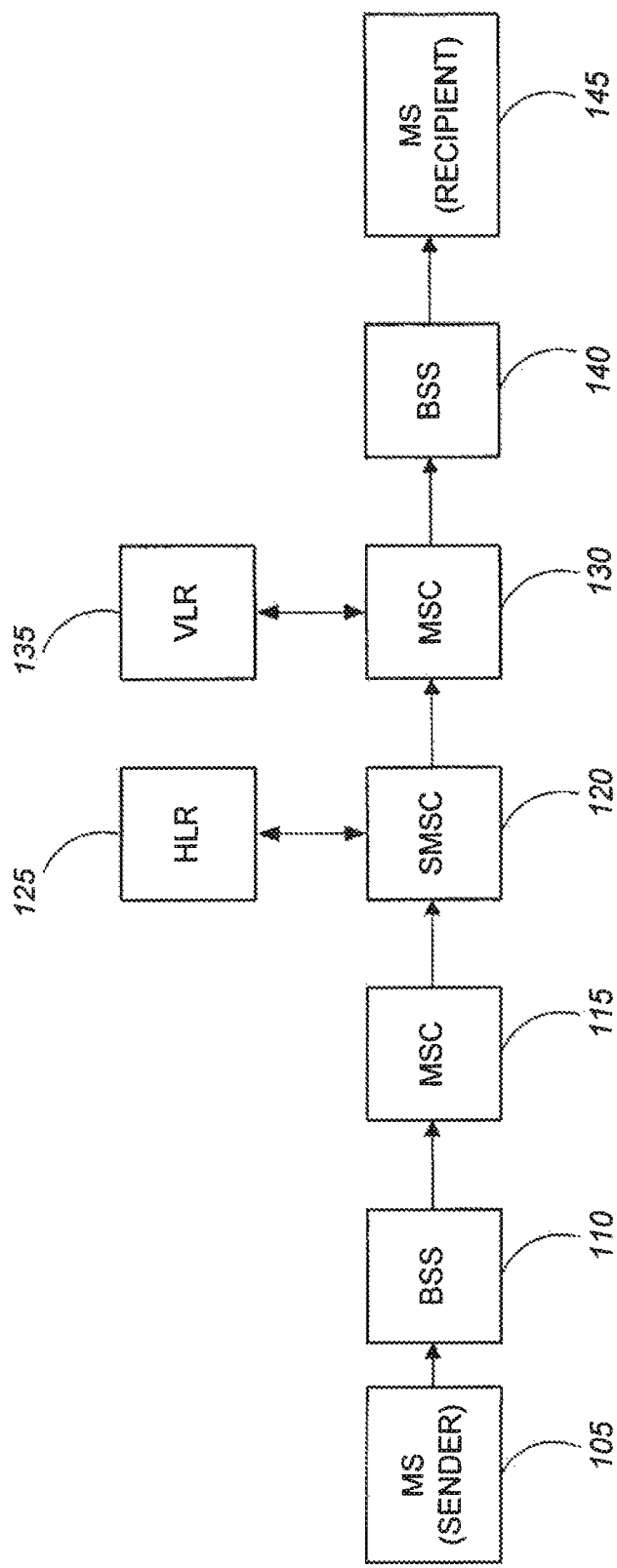
FIG. 1 shows a schematic representation of a conventional transmission path of a short message.
Figure 2:
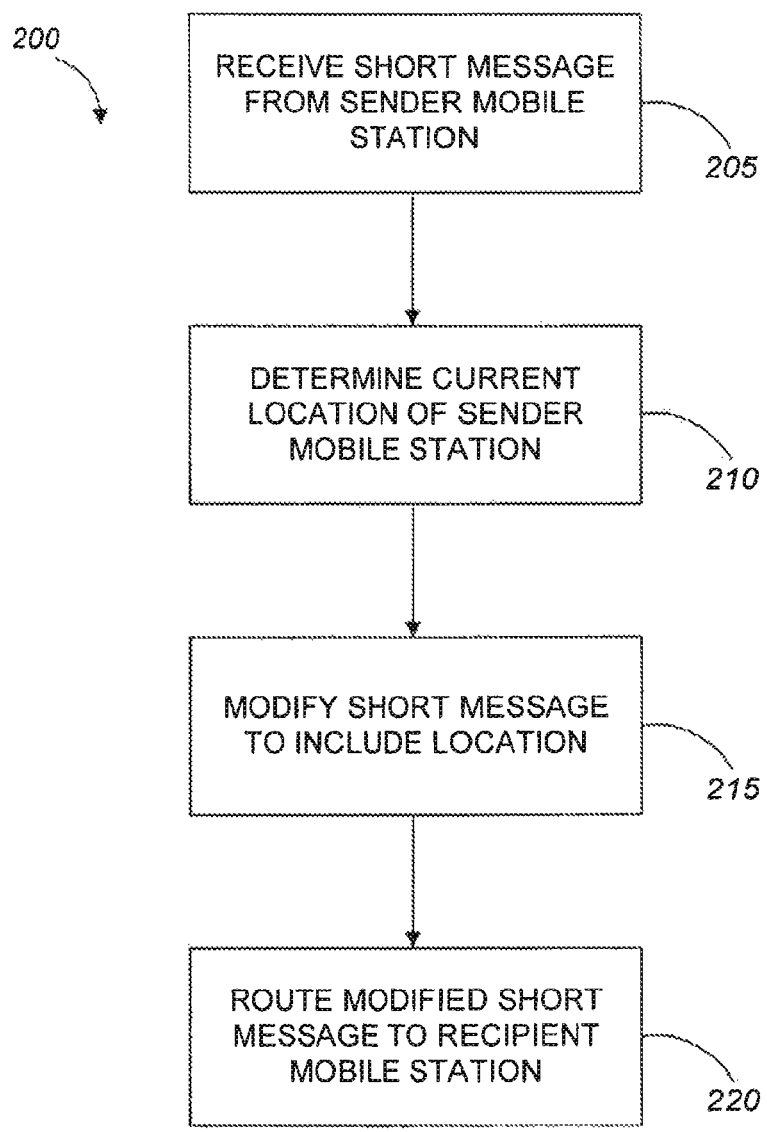
FIG. 2 is a flowchart showing a process for modifying a short message to include a location of a sender.

A short message typically includes some information in addition to the text input by a sender, such as the destination number, the sender's number (e.g., a MSISDN (mobile station integrated services digital number) such as a mobile telephone number, or an e-mail address), the time the short message was sent and a date stamp. Referring to FIG. 2, a process 200 is shown for including a location of a sender at the time a short message originated from the sender in the short message. A SMSC receives a short message that originated with a sender mobile station (step 205) and determines a current location of the sender mobile station (step 210). The SMSC then modifies the short message to include the current location of the sender mobile station (step 215) and proceeds to route the short message to a recipient mobile station (step 220).

Figure 3:
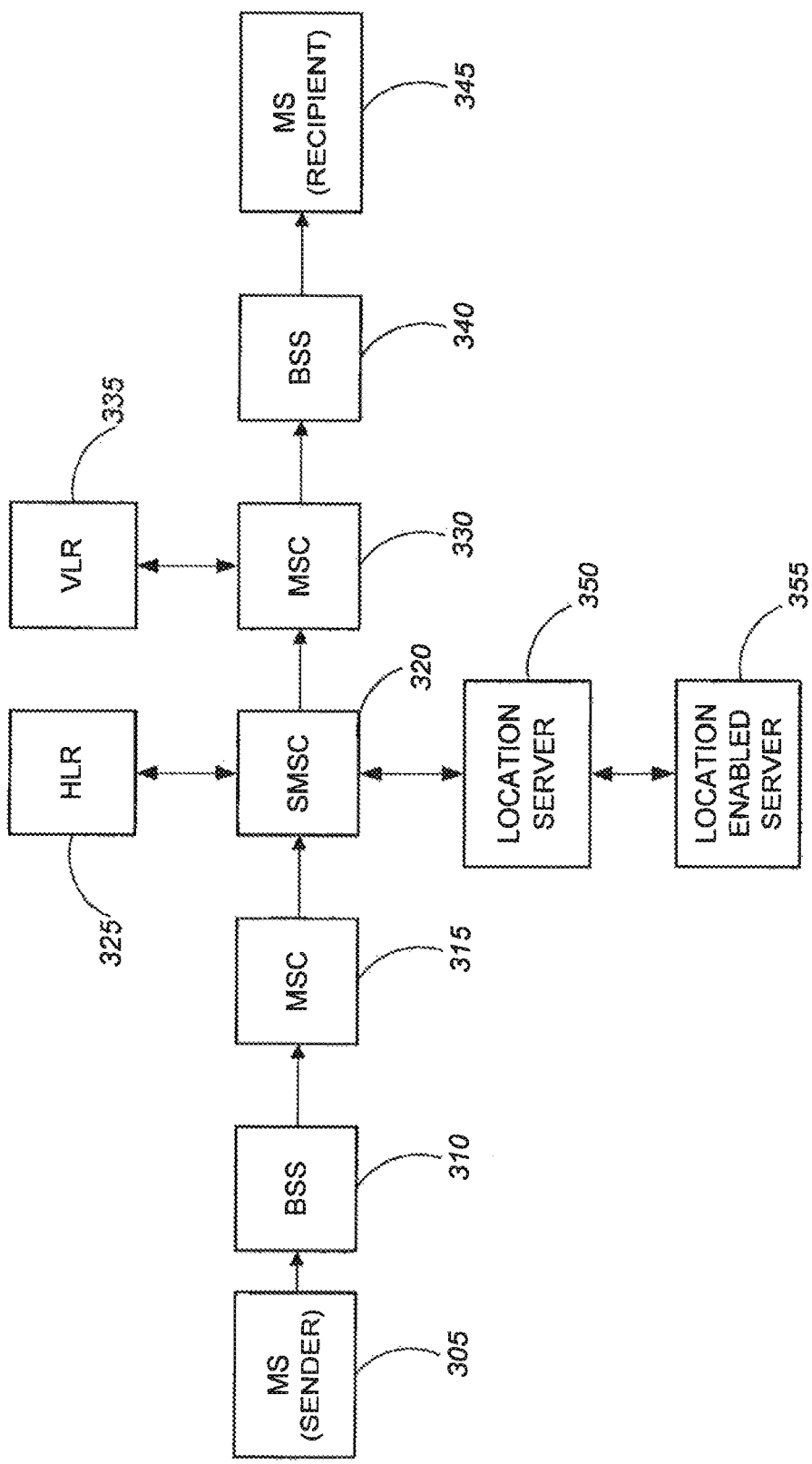
FIG. 3 shows a schematic representation of the transmission path of a short message and a modified short message.
Figure 4:
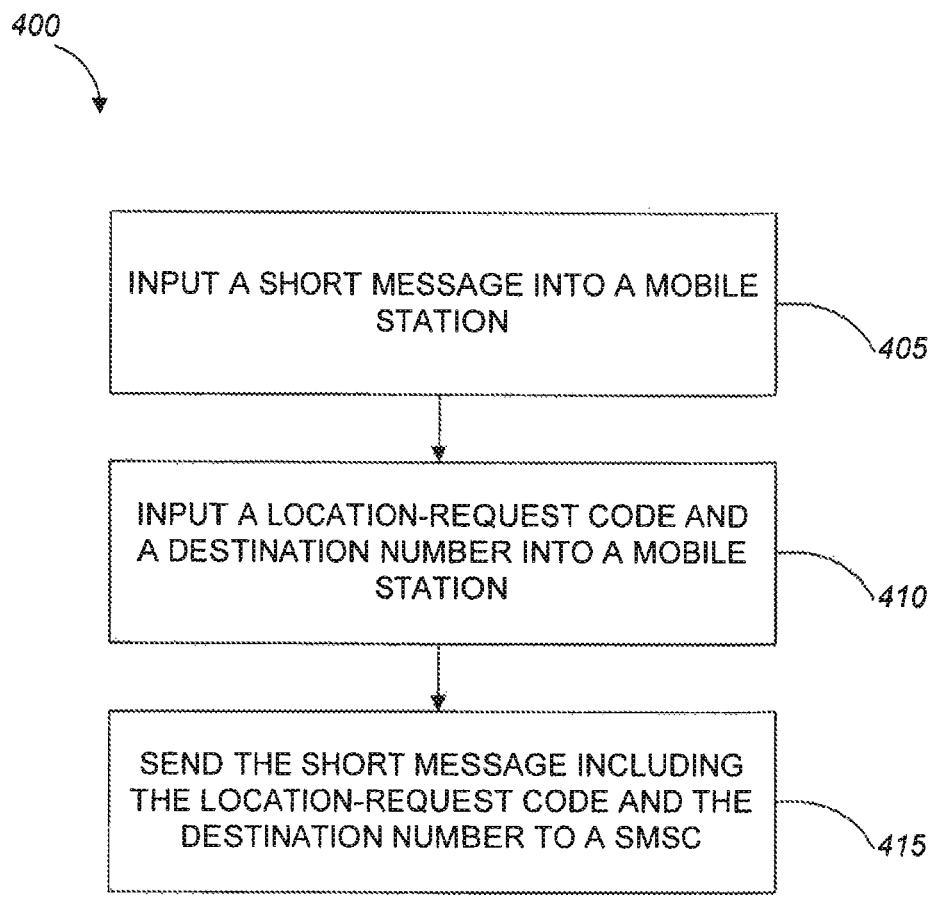
FIG. 4 is a flowchart showing a process for creating a short message including a location request.

Referring to FIG. 3, a transmission path of a short message that is modified to include a location of a sender mobile station 305 is shown. FIG. 4 shows a process 400 of a user of a sender mobile station 305 transmitting a short message. In a first step, a user of the sender mobile station 305 inputs a short message including a destination number associated with a recipient mobile station 345 (step 405). The term destination number as used herein refers to an identifier of a recipient, such as a mobile telephone number associated with a recipient mobile station, an e-mail address, an IP address, and the like, and accordingly may or may not be an actual number per se. The user or system includes within the short message an indication that the current location of the sender mobile station 305 is to be included in the short message that is delivered to the recipient mobile station 345 (step 410). For example, the user or system can add a "location-request code" to the beginning of the destination number, such as inputting prefix digits, e.g., "99", before the destination number.

Alternatively, the location-request code can be programmed into the sender mobile station 305, so that the user can simply press a specified button on the user interface to automatically add the location-request code to the destination number. In another alternative, the sender mobile station 305 can be programmed so that as a default a location-request code is automatically added to the destination number of a short message originating from the sender mobile station 305. Alternatively, a network element other than the sender mobile station 305, such as the SMSC 320 or a MSC 315, can prompt the inclusion of the sender mobile station's location in the short message. For example, the SMSC 320 can determine whether a sender mobile station is "location-enable" (e.g., a subscriber to a location enabled service), and if so then include the location of the sender mobile station in the short message. Other techniques for including a location-request code in a short message can be used. The short message including the location-request code is transmitted from the sender mobile station 305 to a base-station system 310, to a mobile switching center 315 and finally to a SMSC 320 (step 415).

Figure 5:
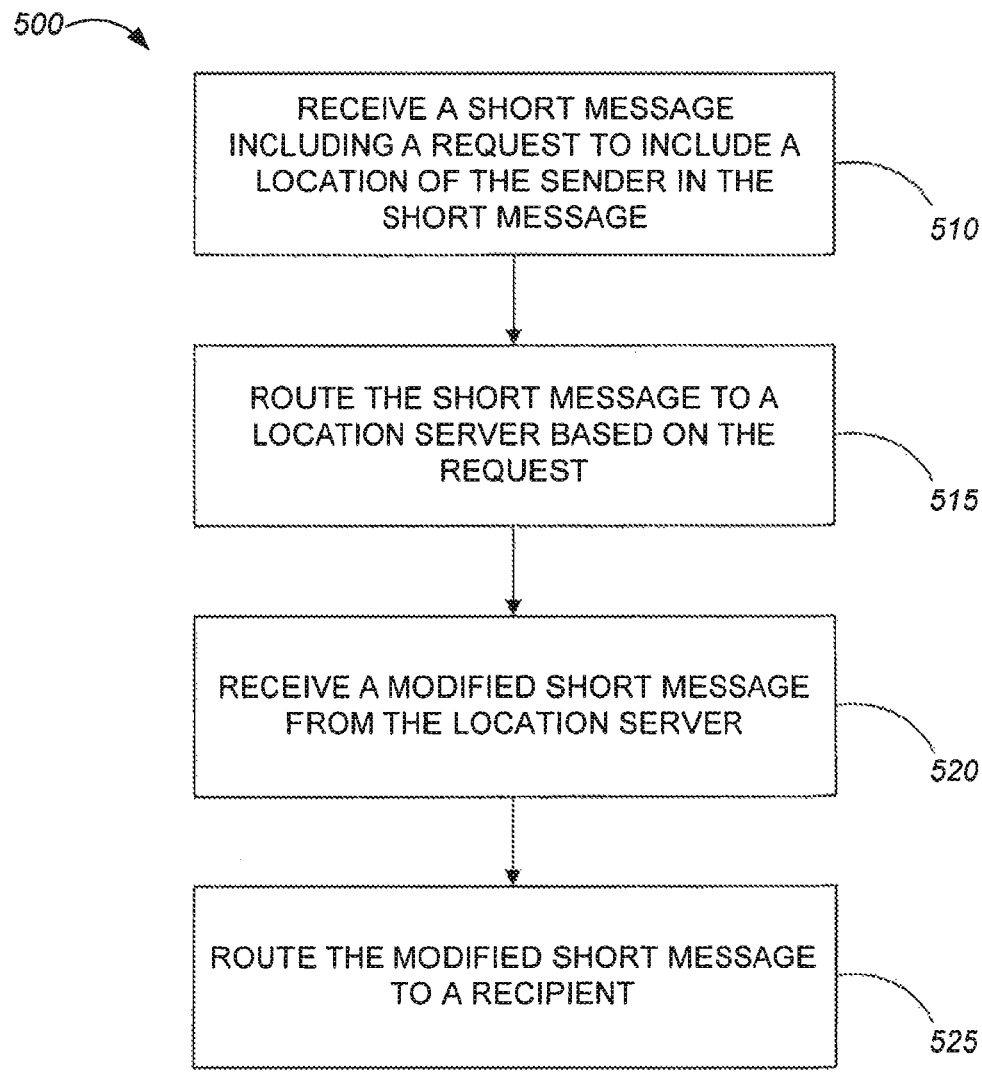
FIG. 5 is a flowchart showing a process for including a location of a sender in a short message.

FIG. 5 shows an exemplary process 500 for including a current location of a sender mobile station in the short message using a location server 350. The process 500 relates to one implementation where a location server 350 is used to determine the current location of the sender mobile station 305. Typically, when the SMSC 320 receives the short message originating from the sender mobile station 305 (step 510), the SMSC 320 uses the destination number included therein to route the short message. The SMSC 320 may use a look-up table to determine an appropriate second SMSC to reroute the short message to if the destination number is on a different network. Alternatively, the SMSC 320 may query the HLR 325 for routing information for the recipient mobile station 345 associated with the destination number, if the destination number is within a network serviced by the SMSC 320. If the destination number is an address, such as an IP address of an application server, the SMSC 320 may route the short message to the address.

When the SMSC 320 receives the short message including the location-request code included at the beginning of the destination number, the SMSC 320 interprets the location-request code as a "destination number" and routes the short message to a location server 350 associated with the destination number. For example, the SMSC 320 can parse the short message to retrieve a destination number beginning with the digits "99" (where "99" is the location-request code). The SMSC 320 performs a look-up in a look-up table to determine a destination associated with "99" and retrieves an address, e.g., an IP address; the address can be the address for the location server 350. The SMSC 320 then transmits the short message to the address, i.e., to the location server 350 (step 515). The location server 350 is capable of receiving and sending short messages and is therefore a short messaging entity (SME). The SMSC 320 does not need to be aware of the purpose of routing the short message to the location server 350, i.e., to determine a current location of the sender mobile station 305, and from the perspective of the SMSC 320, processing of the short message is complete, since a destination was determined (i.e., the location server 350) and the short message was routed accordingly.

The SMSC 320 subsequently receives a modified short message from the location server 350 (step 520); the SMSC 320 may not necessarily recognize the modified short message as a modified version of a previously processed short message, i.e., from the perspective of the SMSC 320 the modified short message is just another short message to be processed. The SMSC 320 can use a destination number for the recipient mobile station 345 included in the modified short message to route the modified short message to a second SMSC for processing or to query the HLR 325 for routing information for the recipient mobile station 345, and route the modified short message to a mobile switching center 330 based on the routing information (step 525). For the purpose of this example, the modified short message is not re-routed to a second SMSC. The mobile switching center 330 may interrogate a VLR 335 for temporary routing information about the recipient mobile station 345 and, based on the information, route the modified short message to a base-system station 340 serving the vicinity of the recipient mobile station 345. The modified short message is then finally sent from a base-station transceiver to the recipient mobile station 345.

In another implementation, the location server 350 can include, or have access to, information so that the location server 350 can determine an appropriate SMSC to route the modified short message to, based on the destination number. The location server 350 can then route the modified short message directly to the appropriate SMSC, rather than automatically route the modified short message back to the SMSC 320, although in some instances the SMSC 320 will be the appropriate SMSC.

Figure 6:
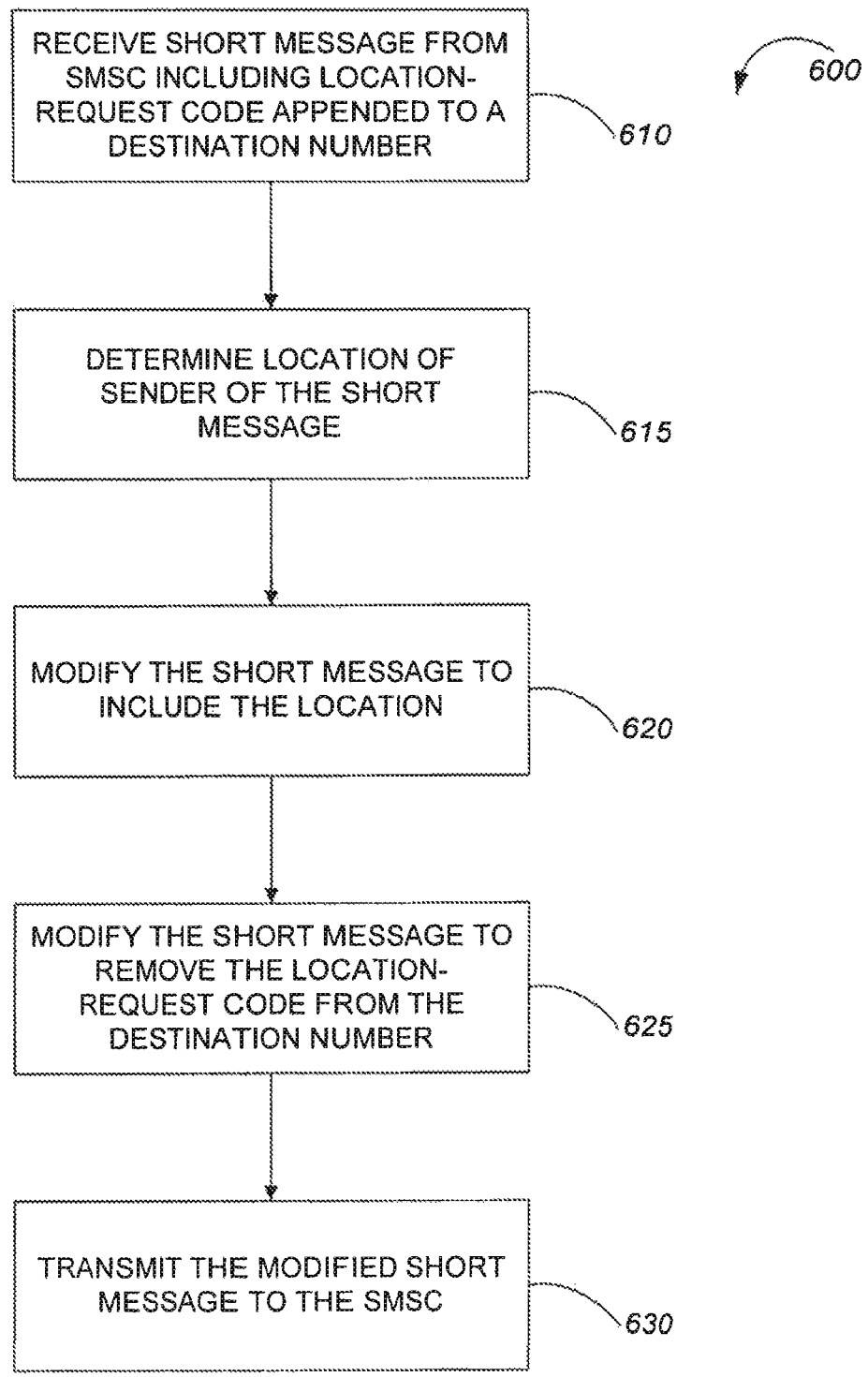
FIG. 6 is a flowchart showing a process for modifying a short message to include a location of a sender.

Referring to FIG. 6, a process 600 is shown wherein the location server 350 determines a current location of the sender mobile station 305 and modifies the short message. The location server 350 receives the short message from the SMSC 320 (step 610), the short message including the sender's number, that is, a number associated with the sender mobile station 305. The location server 350 can use various techniques for determining the sender mobile station's 305 current location (step 615). In one implementation, location server 350 includes, or has access to, information about which "location-enabled server" (LES) in a mobile network is dynamically tracking the location of the sender mobile station 305. For example, the location server 350 can look-up the sender's number in a look-up table and determine an address of a corresponding LES. A LES is a server maintained by a network provider, for example, AT&T Wireless, that dynamically tracks the location of network users typically in the form of geographic coordinates, i.e., the latitude and longitude of the sender mobile station's 305 position. The location server 350 can send a request via the wireless or a wired network to the LES 355, which responds by transmitting the current location of the sender mobile station 305 to the location server 350.

In another implementation, the location server 350 can passively monitor the locations of network users, for example, by receiving location information from network probes that monitor the network users that are within the vicinity of a probe at a given time, and periodically caching the location information. When a location is required, the location server 350 retrieves the location from the cache of location information. The location cache can be compiled by using location information from existing network probes, network probes that exist for the purpose of providing information to a location server, or a combination of the two. For example, a network probe can be an acceSS7 device available from Agilent Technologies of Palo Alto, Calif. Other techniques for determining the location of the sender mobile station 305 can be used.

As mentioned above, the location of the sender mobile station 305 determined by the location server 350 can be in the form of geographic coordinates, i.e., the latitude and longitude of the sender mobile station 305. A user of the recipient mobile station 345 may prefer the location to identify a city, street or street address. Thus, optionally, the location server 350 can translate the determined location from a received format, such as geographic coordinates, into a more meaningful format, such as a street address, for example, by querying a database including geographic coordinate locations mapped to street address locations.

The location server 350 modifies the short message to include the location of the sender mobile station 305 (step 620), the location being expressed in any desirable format, such as geographic coordinates, a street address or otherwise. The location server 350 can perform a further modification to the short message before transmitting the short message back to the SMSC 320; the location server 350 can remove the location-request code, since the location request has now been satisfied. That is, the location server 350 can remove the location-request code that was added to the beginning of the destination number (step 625). The location server 350 now transmits the modified short message back to the SMSC 320 (step 630).

The modified short message received by the SMSC 320 includes a destination number without the location-request code added thereto. Accordingly, when the SMSC 320 parses the short message to determine a destination number to which to route the short message, the SMSC 320 determines the destination number associated with the recipient mobile station 345. The SMSC 320 can look-up the destination number in a look-up table, and if the destination number is in a different network, the SMSC 320 routes the modified short message to a SMSC in the different network, otherwise (as is the case in the present example) the SMSC 320 queries the HLR 325 for routing information. By contrast, when the SMSC 320 received the original short message (i.e., pre-modification), and looked up the destination number (which included as prefix digits the location-request code) in a look-up table, the SMSC 320 found an address for the location server 350 and routed the short message to the location server 350. By the location server 350 removing the location-request code from the short message, the SMSC 320 can now route the modified short message to the appropriate destination number, that is, the destination number associated with the recipient mobile station 345.

In some instances, a SMS Router can be included in the mobile network, and typically sits in front of a SMSC. A short message can be transmitted from a MSC to the SMS Router which looks at the destination number and determines whether the short message should continue to the SMSC or be rerouted to a different SMSC (i.e., if the destination number is in a different network), or whether the destination is an address, e.g., an IP address for an application server, in which case the short message is routed to the application server without reaching the SMSC. In such an instance, the process described in reference to FIG. 5 would differ slightly in that the short message would be routed from the MSC 315 to the SMS Router to the location server 350, without first being routed to the SMSC 320. It should also be noted that the MSC 315 and the MSC 330 can be the same MSC if, for example, the sender mobile station 305 and the recipient mobile station 345 were both in locations being serviced by the same MSC when the short message originated from the sender mobile station 305.

In the above example of including a location of a sender mobile station in a short message, a location server 350 was used to determine the location and modify the short message. However, the steps performed by the location server 350 can be performed by a SMSC or some other entity along the transmission path of the short message. An advantage of using a location server is that a short message can be modified to include a location of the sender without requiring a software or hardware upgrade of the wireless network elements, including the SMSC. The SMSC can process a short message that includes a location request without awareness of the location request, and the short message can be seamlessly diverted to and received back from the location server with the location of the sender added thereto. Additionally, mobile users can use the location request service with a mobile station, e.g., a mobile telephone, that is two-way SMS capable without requiring any upgrades to the mobile station.

Figure 7:
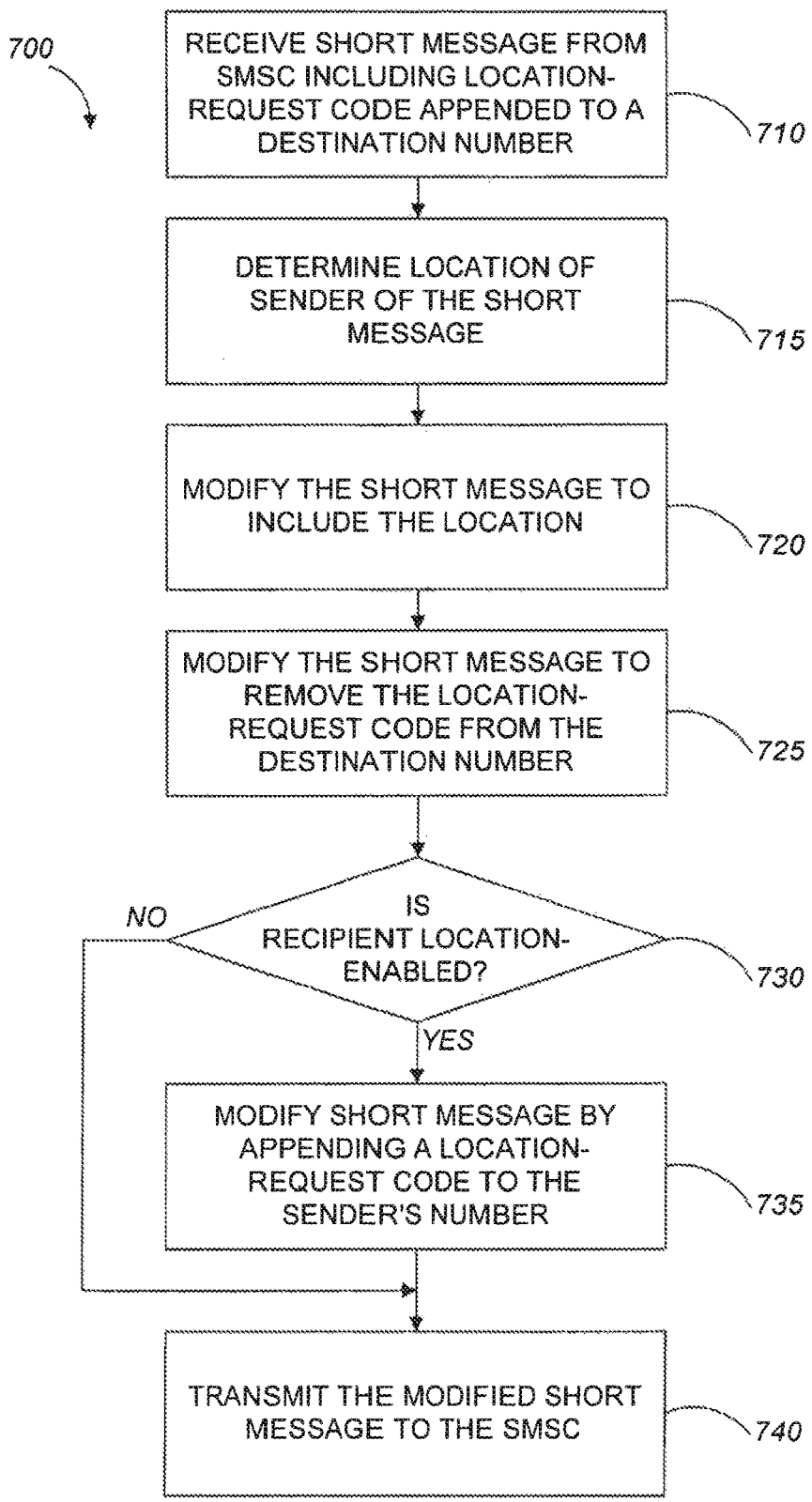
FIG. 7 is a flowchart showing a process for modifying a short message to include a location of a sender and include a location-request for a reply to the short message.

Referring to FIG. 7, a process 700 for modifying a short message to include a location of the sender mobile station 305 is shown that includes at least one additional step, performed in the illustrated implementation by the location server 350. The location server 350 receives the short message from the SMSC 320 (or an SMS Router as the case may be), the short message including the location-request code added to a destination number (step 710). The location server 350 determines a location of the sender mobile station 305 (step 715), modifies the short message to include the location (step 720) and further modifies the short message to remove the location-request code from the destination number (step 725).

The location server 350 can determine if the recipient mobile station 345 associated with the destination number is "location-enabled" (step 730). That is, the location server 350 can determine whether a short message originating from the recipient mobile station 345 can include a location-request, which location-request can be satisfied by a mobile network used by the recipient mobile station 345 (e.g., whether the recipient mobile station has subscribed to a "location-enabled" service). If the recipient mobile station 345 is location-enabled ("Yes" branch of decision step 730), then the location server 350 further modifies the short message to add a location-request code to the sender's number (which sender's number was included in the original short message) (step 735). If the recipient mobile station 345 is not location-enabled ("No" branch of decision step 730), then no further modifications are made to the short message. The location server 350 then transmits the modified short message back to the SMSC 320 (step 740).

The location server 350 can determine whether the recipient mobile station 345 is location-enabled using any convenient means. In one implementation, a user of the recipient mobile station 345 can create a user profile in a database that is accessible by the location server 350. For example, the user can complete a user profile form on a webpage, which form is used to create a database record associated with the user. Included in the user profile will be information as to whether or not the user is a subscriber to a location-enabled service. The location server 350 can determine from the user profile whether or not the recipient mobile station 345 is location-enabled. In another example, the user profile may provide information, such as the user's account number with a mobile subscription service and an address for the mobile subscription service, and the location server can query the mobile subscription service to determine whether or not the user subscribes to a location-enabled service.

The sender's number is typically included in any short message originating from the sender mobile station 305 so that a recipient mobile station can reply to the short message, and have the reply automatically routed back to the sender's number. If the location-request code is added to the sender's number, then when the recipient mobile station 345 replies to the modified short message, the "destination number" for the reply short message includes the location-request code.

When the reply short message is received by a SMSC, the location-request code will trigger the process described above in relation to FIGS. 5 and 6. That is, the SMSC will determine the location of the recipient mobile station 345 (now the short message originator) and modify the reply short message to include the location of the recipient mobile station 345.

In the exemplary process described above, a location server determined whether the recipient mobile station 345 was location-enabled and, if so, modified the short message to add a location-request code to the sender's number. However, this function can be performed by a SMSC or other entity along the transmission path of the short message. The step 730 of determining whether a recipient mobile station is location enabled can be eliminated, and the short message automatically can be modified to include a location-request code at the beginning of the sender's number. However, the additional service of having a location included in a short message may be implemented as a value-added service for which a mobile subscriber must pay an extra fee, for example, a monthly flat fee or a per message fee. Under such conditions, the additional step 730 facilitates ensuring that only paying mobile subscribers benefit from the service.

The example of processing a short message described above in reference to FIG. 3 was illustrated using a simplified transmission path. One skilled in the art will recognize that a short message may be transmitted to a first SMSC and, if the destination number is not in the mobile network serviced by the first SMSC, an appropriate second SMSC in a different mobile network can be identified, e.g., using look-up tables, and the short message routed to the second SMSC. Alternatively, as mentioned above, the process of identifying an appropriate SMSC and rerouting of the short message can be performed by a SMS Router that intercepts the short message before the message reaches the first SMSC, or which is included within the SMSC. The example described a short message sent between two mobile stations 305 and 345. However, the short message may be sent between a mobile station and a SME that is not a mobile station, for example, an e-mail address or an IP address of an application server.

Figure 8:
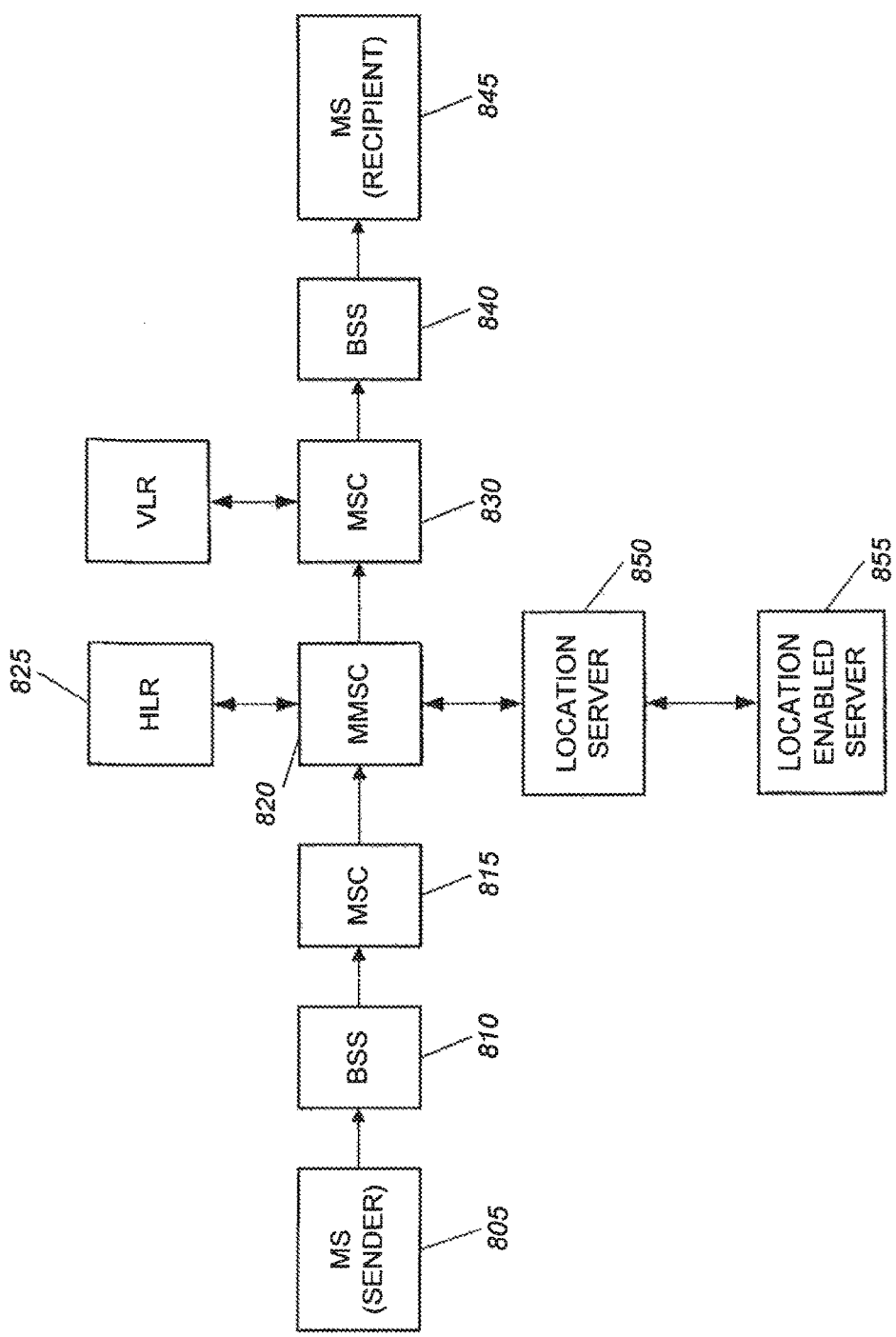
FIG. 8 shows a schematic representation of the transmission path of a multi-media message and a modified multi-media message.
Figure 9:
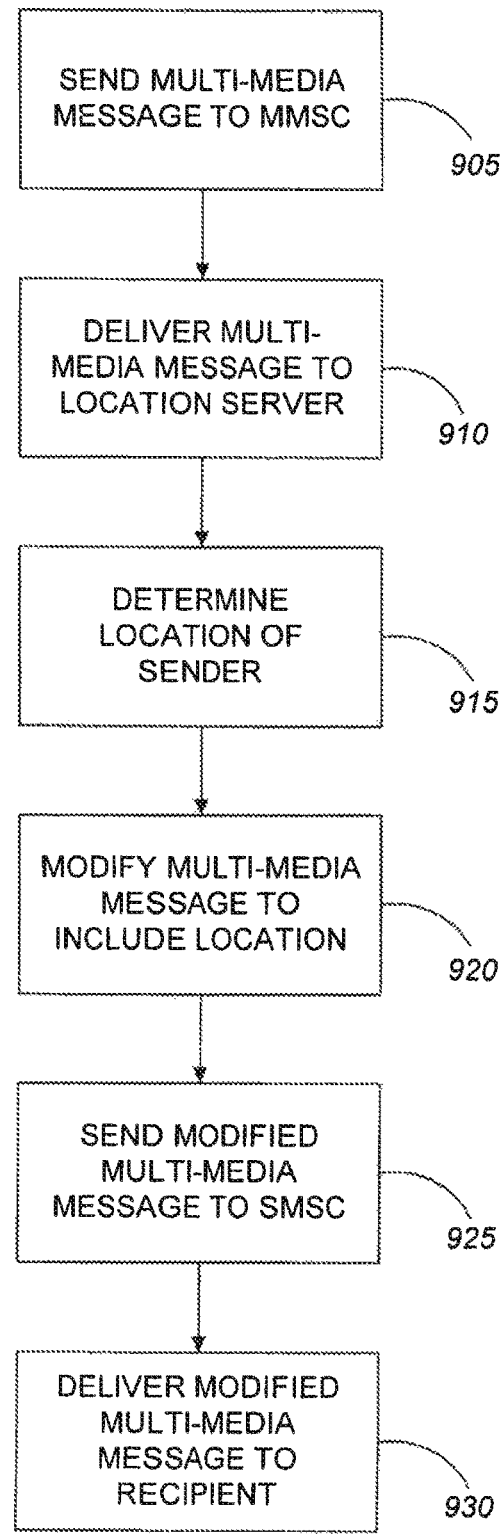
FIG. 9 is a flowchart showing a process for including a location of a sender in a multi-media message.

The processes and systems described above to include a location in a short message can be implemented in other messaging services. For example, the location of a sender mobile station from which a multi-media message originates can be included in the multi-media message. Referring to FIGS. 8 and 9, a multi-media message can originate from a sender mobile station 805. The multi-media message includes a destination number associated with a recipient, in this example, a recipient mobile station 845. A location-request code can be included in the multi-media message using similar techniques described above in reference to short messages. That is, a user can include prefix digits before the destination number, such as "99", indicating that the user wants the location of the sender mobile station 805 to be included in the multi-media message delivered to the recipient mobile station 845.

The multi-media message is transmitted from the sender mobile station 805 to a base-station system 810, to a mobile switching center 815 and finally to a multi-media messaging service center (MMSC) 820 (step 905). Alternatively, a MMS Router can intercept the multi-media message before the message reaches the MMSC 820, or the MMSC 820 can include a MMS Router. In this example, the MMSC 820 determines whether the destination number is in the mobile network serviced by the MMSC 820, for example, by looking up the destination number in a look-up table. Because the location-request code 99 has been added to the beginning of the destination number associated with the recipient mobile station 845, the MMSC 820 will determine from the look-up table that an address of an application server is associated with the location-request code (i.e., the 99). The address can be the address of the location server 850, and the MMSC 820 delivers the multi-media message to the location server 850 (step 910).

The location server 850 determines the sender's number from the multi-media message and determines the current location of the sender mobile station 805 associated with the sender's number (step 915). The location server 850 can use similar techniques described above in reference to short messaging, for example, by querying a LES 855. The location server 850 modifies the multi-media message to include the location of the sender mobile station 805 (step 920) and transmits the modified multi-media message to the MMSC 820 (step 925), or alternatively can send the modified multi-media message to a different MMSC, if the destination number is a network that is not serviced by the MMSC 820. The location server 850 can remove the location-request code from the destination number, such that the MMSC 820 can parse the modified multi-media message to retrieve the destination number associated with the recipient mobile station 845, and route the modified multi-media message accordingly. The modified multi-media message routes from the MMSC 820 to a MSC 830 (which in some instances can be the same as MSC 815), to a base-station system 840 and finally to the recipient mobile station 845 (step 930).

As discussed above in the context of short messaging, some or all of the steps performed by the location server 850 can be performed by a MMSC 820 or other network element directly or indirectly in the transmission path of a multi-media message.

In another implementation, a location-request code included in a multi-media message can trigger the MMSC 820 to determine the location of the sender mobile station 805 and modify the multi-media message to include the location. If the recipient mobile station 845 is not MMS-enabled, then the multi-media message can be modified to include the location of the sender mobile station 805 before storing the multi-media message on an Internet accessible server and transmitting a corresponding notification message to the recipient mobile station 845. If the recipient mobile station 845 is MMS-enabled and the content of a multi-media message can be sent directly to the recipient mobile station 845, then the modified multi-media message is sent to the recipient mobile station 845.

An additional step, which can be performed by the location server 850 or some other network element, to add a location-request code to the sender's number within the multi-media message can be performed, using similar techniques as discussed above.

Figure 10:
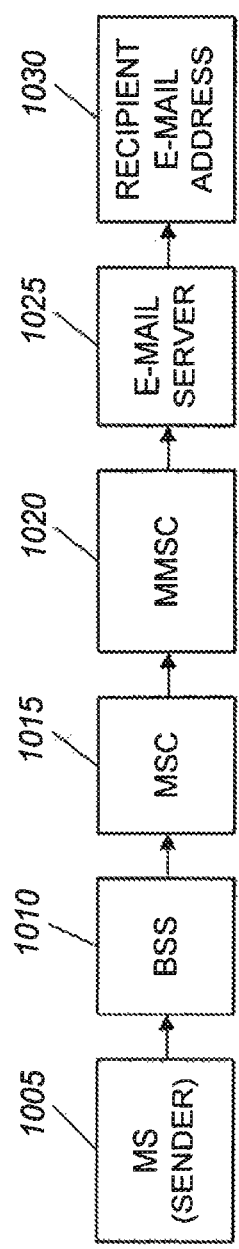
FIG. 10 shows a schematic representation of a transmission path of a multi-media message delivered to an e-mail address.

Referring to FIG. 10, a sender mobile station 1005 can address a multi-media message to a recipient 1030 that is not a mobile station, for example, an e-mail address. The multi-media message is transmitted from the sender mobile station 1005 to a base-station system 1010, to a mobile switching center 1015 and finally to a MMSC 1020. The MMSC routes the multi-media message to an e-mail server 1025, which e-mail server 1025 delivers the multi-media message to the recipient e-mail address 1030.

Figure 11:
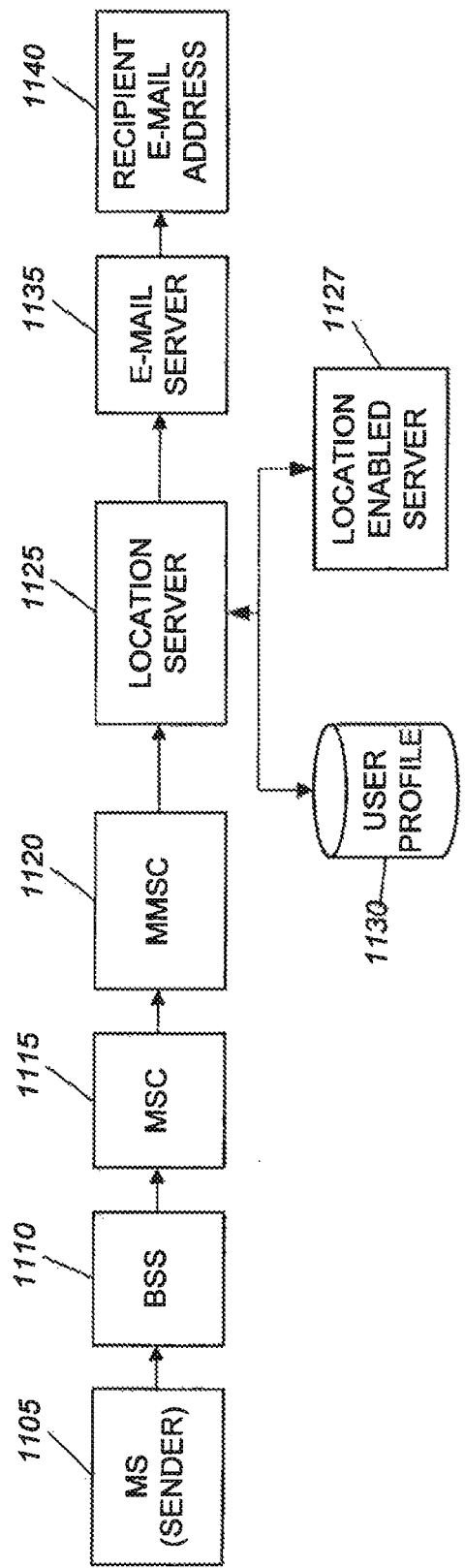
FIG. 11 shows a schematic representation of a transmission path of a multi-media message and a modified multi-media message that is delivered to an e-mail address.

Referring to FIG. 11, a user of a sender mobile station 1105 can include a location-request in a multi-media message for delivery to a recipient e-mail address 1140, rather than a recipient mobile station. In this implementation, the multi-media message is modified to include the location of the sender mobile station 1105 by a location server 1125, although another network element, such as the MMSC 1120, can perform this step. In the implementation where an entity other than the MMSC 1120 is modifying the multi-media message, such as the location server 1125, then in order for the multi-media message to be routed to the location server 1125, the multi-media message is initially transmitted to an address associated with the location server 1125, rather than the recipient e-mail address 1140.

Figure 12A:
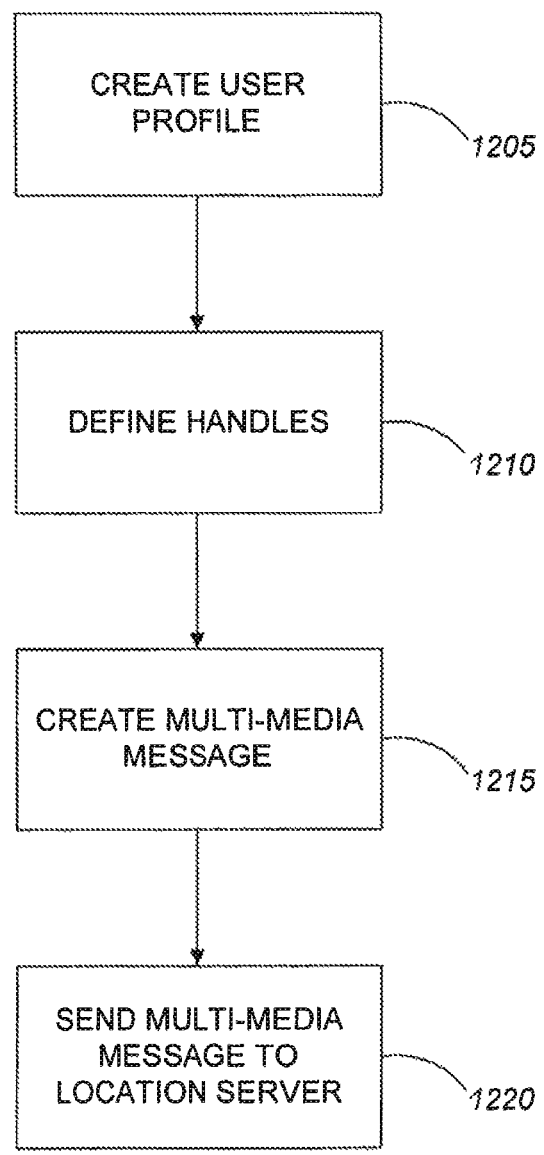
FIG. 12A is a flowchart showing a process for creating a multi-media message including a location-request.

Referring to FIG. 12A, in one implementation the multi-media message can be initially delivered to the location server 1125 and then rerouted to the recipient e-mail address 1140 as follows. The user of the sender mobile station 1105 can create a user profile that is stored in a location, such as a web server or a database, that is accessible by the location server 1125 (Step 1205). For example, the user can access a website over the Internet that provides a web page for creating a user profile. The user inputs information prompted by the web page, thereby creating the user profile, which may be stored as a database record. The user profile may include definitions of "handles" (i.e., aliases) for potential recipients of multi-media messages originating from the user's mobile station. For example, a handle for an e-mail address of newman@xyzcompany.com may be "newman-xyz". The web page prompts the user to define handles for e-mail addresses the user may wish to send multi-media messages to from the user's mobile station (step 1210). The handle definitions are stored as part of the user profile, and therefore also accessible by the location server 1125.

A sender, such as the user referred to above, creates a multi-media message, for example, by taking a digital photograph with the sender's mobile telephone, which is intended for delivery to newman@xyzcompany.com (step 1215). However, rather than input the newman@xyzcompany.com e-mail address as the destination number for the multi-media message, the sender inputs an e-mail address that will direct the multi-media message to the location server 1125 (step 1220), which e-mail address includes the handle associated with the recipient c-mail address, i.e., the handle "newman-xyz". For example, the sender can input the following e-mail address: newman-xyz@locationserver.com (i.e., handle@locationserver.com). The multi-media message will route from the sender's mobile station 1105 to a BSS 1110, to a MSC 1115 and to the MMSC 1120. The MMSC 1120 will route the multi-media message to an application server associated with the e-mail address, which in this case is the location server 1125.

Figure 12B:
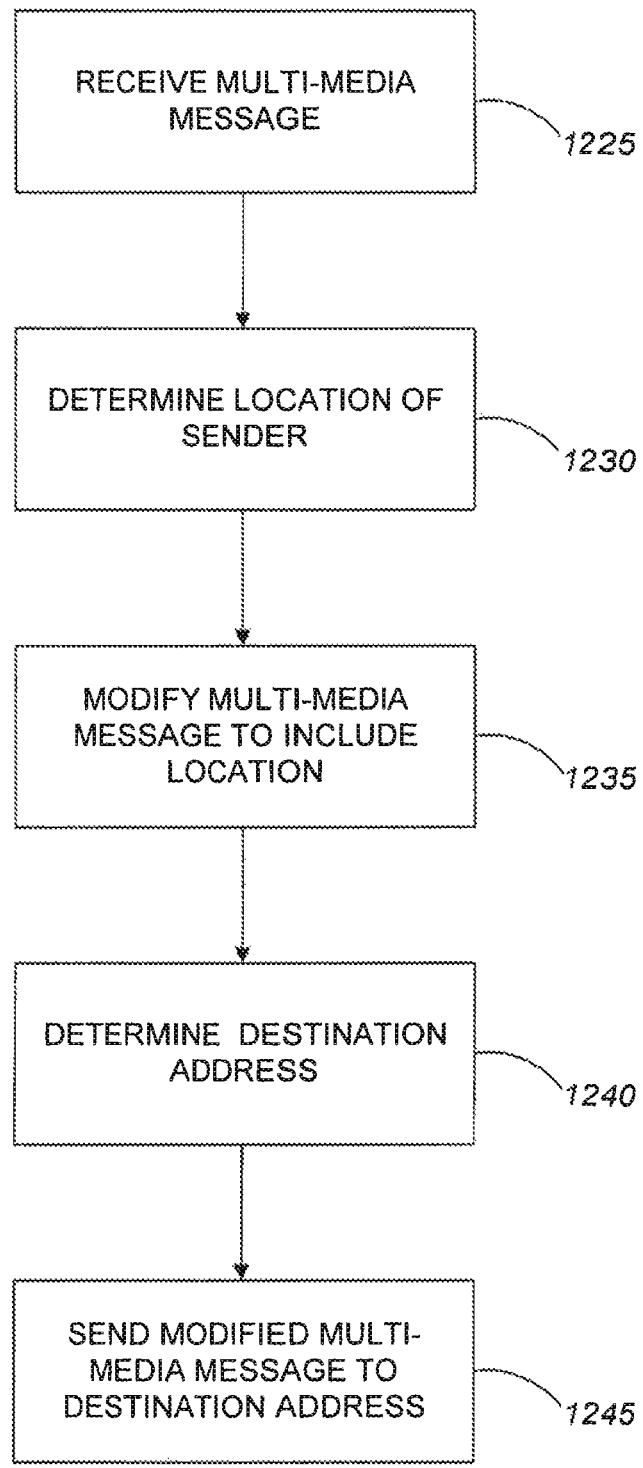
FIG. 12B is a flowchart showing a process for including a location of a sender in a multi-media message for delivery to an e-mail address.

Referring to FIG. 12B, when the location server 1125 receives the multi-media message (step 1225), the location server 1125 parses the multi-media message to determine the sender's number. The location server 1125 determines the current location of the sender's mobile station 1105, for example, by sending a request to a location-enabled server 1127 requesting the location of a mobile station associated with the sender's number, using similar techniques as described above (step 1230). The location server 1125 modifies the multi-media message to include the location of the sender's mobile station 1105 (step 1235). The modified multi-media message can be routed to the recipient e-mail address 1140. The multi-media message included destination information, in this instance, the handle associated with the recipient e-mail address was included in the original destination number, i.e., the e-mail to which the multi-media message was originally sent. The location server 1125 retrieves the user profile 1130 associated with the sender's number, and determines from the user profile an e-mail destination address associated with the handle provided by the destination information (step 1240). That is, the sender addressed the multi-media message to newman-xyz@locationserver.com, thereby indicating that the handle of the recipient e-mail address is newman-xyz. The location server 1125 determines from the sender's user profile that newman-xyz is a handle for newman@xyzcompany.com, which is therefore the recipient e-mail address 1140. The location server 1125 sends the modified multi-media message to the recipient e-mail address 1140 (i.e., destination address) (step 1245). The modified multi-media message may be routed first to an e-mail server 1135 and then delivered to the recipient e-mail address 1140.

In one implementation, the multi-media message can be further modified to include a location-request code before the sender's number, so that a reply message is sent to the sender with the location of the recipient included therein, using similar techniques as described above in reference to SMS.

In another implementation, the sender mobile station 1105 can include the corresponding user profile, which includes the handle definitions. The sender can request that the location of the sender mobile station 1105 be included in a multi-media message, for example, by inputting a location-request code into the sender mobile station 1105 or setting the mobile station 1105 to automatically request the location be included in all such messages. The sender can specify the recipient e-mail address by either entering the entire e-mail address or entering the handle. The sender mobile station 1105 can automatically route the multi-media message to the appropriate e-mail address, e.g., handle@locationserver.com. This technique may require upgrades to the sender mobile station 1105, but can facilitate the sender's experience.

The above example is illustrative, and describes one technique for routing a multi-media message to a location server for modification to include a location, and then rerouting to a final destination e-mail address. Other techniques can be used. Additionally, the multi-media message can be modified to include a location by a location server, as described, or by another network element, for example, the MMSC.

An MMSC 820 can determine from a destination number a format for a multi-media message that is compatible with the recipient associated with the destination number, and convert the multi-media message into the format before delivering the message to the recipient. Thus, an MMSC 820 may determine a format for the multi-media message that is compatible with the location server 850 (i.e., the recipient associated with the destination number, based on the 99 included before the recipient destination number), and the MMSC 820 may deliver the multi-media message to the location server 850 in the determined format. In one implementation, the location server 850 determines a format for the multi-media message that is compatible with the recipient based on the destination number associated with the recipient and, if necessary, changes the format of the modified multi-media message to the determined format before transmitting the modified multi-media message to an MMSC 820 or e-mail server 1025.

The techniques described above for determining a location of a sender of a short message or a multi-media message can be implemented for other messaging services using similar techniques. For example, the techniques can be implemented for Smart Messaging, Enhanced Messaging Services and using iMode available in Japan.

A number of embodiments of the invention have been described. Nevertheless, it will be understood that various modifications may be made without departing from the spirit and scope of the invention. The logic flows depicted in FIGS. 2, 4-7, 9, 12A and 12B do not require the particular order shown, or sequential order, to achieve desirable results, and the steps of the invention can be performed in a different order and still achieve desirable results. Accordingly, other embodiments are within the scope of the following claims.

What is claimed is:

1. An apparatus comprising:
 a messaging server configured to:
  receive a message of a sender which is input through a sender's mobile device and send the message to a recipient's mobile device, wherein the message is one of a short message service (SMS) message and a multimedia messaging service (MMS) message;
  provide the message to a location server; and
 the location server being configured to:
  determine whether the sender is a subscriber to a location-enabled service, obtain location information about a location of the sender's mobile device in response to the determination that the sender is the subscriber; and
  modify the message to add the location information of the sender's mobile device; and
  provide the modified message to the message server;
 wherein the message server is further configured to:
  transmit the modified message to the recipient's mobile device; and
  provide a webpage in which the sender is allowed to create a user profile including the sender's subscription to the location-enabled service.

2. The apparatus of claim 1, wherein the messaging server is further configured to identify the recipient's mobile device by using account information of the recipient.

3. The apparatus of claim 1, wherein the location server is configured to obtain the location information of the sender's mobile device from an external server of a communication network provider.

4. A method comprising:
 receiving a message of a sender which is input through the sender's mobile device, wherein the message is one of a short message service (SMS) message and a multimedia messaging service (MMS) message;
 determining whether the sender is a subscriber to a location-enabled service, and obtaining a location of the sender's mobile device in response to the determination that the sender is the subscriber;
 modifying the message to add the location of the sender's mobile device;
 sending the modified message to the recipient's mobile device; and
 providing a webpage in which the sender is allowed to create a user profile including the sender's subscription to the location-enabled service.

5. The method of claim 4, further comprising obtaining the location information of the sender's mobile device from an external server of a communication network provider.

* * * * *